(12) United States Patent (10) Patent No.: US 6,302,253 B1
Link et al. (45) Date of Patent: Oct. 16, 2001

(54) TORQUE TRANSMISSION UNIT

(75) Inventors: Achim Link, Schweinfurt; Wolfgang Reisser, Sennfeld; Sebastian Vogt, Bad Neustadt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/517,796

(22) Filed: Mar. 2, 2000

(30) Foreign Application Priority Data

Mar. 2, 1999 (DE) .............................................. 199 08 996
Feb. 11, 2000 (DE) .............................................. 100 05 996

(51) Int. Cl.[7] .............................. F16D 3/12; F02N 11/04; F16F 15/10
(52) U.S. Cl. .................................. 192/55.61; 192/70.17; 74/7 C; 290/46; 310/74
(58) Field of Search ............................ 192/55.61, 70.17; 74/7 C, 574; 180/165; 290/46; 310/74

(56) References Cited

U.S. PATENT DOCUMENTS

| | | | |
|---|---|---|---|
| 3,652,883 | * | 3/1972 | Cone ........................................ 310/74 |
| 4,346,773 | * | 8/1982 | Hofbauer et al. ...................... 180/165 |
| 4,894,570 | * | 1/1990 | Kaneyuki .............................. 310/113 |
| 4,918,323 | * | 4/1990 | Aso ........................................ 290/46 |
| 5,482,512 | * | 1/1996 | Stevenson ................................ 475/5 |
| 5,789,823 | * | 8/1998 | Sherman ................................. 290/47 |
| 5,927,452 | * | 7/1999 | Friese et al. ......................... 192/3.52 |

FOREIGN PATENT DOCUMENTS

| | | | |
|---|---|---|---|
| 36 30 398 | 3/1990 | (DE) | ............................. F16D/13/60 |
| 43 23 601 | 1/1995 | (DE) | ............................. B60K/6/04 |
| 43 23 602 | 1/1995 | (DE) | ............................. B60K/6/04 |
| 44 44 196 | 6/1995 | (DE) | ............................. F16D/13/60 |

* cited by examiner

*Primary Examiner*—Richard M. Lorence
(74) *Attorney, Agent, or Firm*—Cohen, Pontani, Lieberman & Pavane

(57) ABSTRACT

Torque transmission unit includes an input shaft and an output shaft with a torsion damping device functionally arranged between the input shaft and an output shaft. A shift clutch is also operatively arranged between the input shaft and the output shaft for selectively varying the torque transmitted from the input shaft to the output shaft. The torsion damping device has at least a primary mass and a secondary mass, the primary mass being effectively connected to the input shaft and the secondary mass being effectively connected to the output shaft. The torque transmission unit further comprises an electric machine with a stator and a rotor effectively connected to the input shaft. At least one of the shift clutch and the torsion damping device is arranged within an annular space delimited by the rotor and the stator of the electric machine.

12 Claims, 14 Drawing Sheets

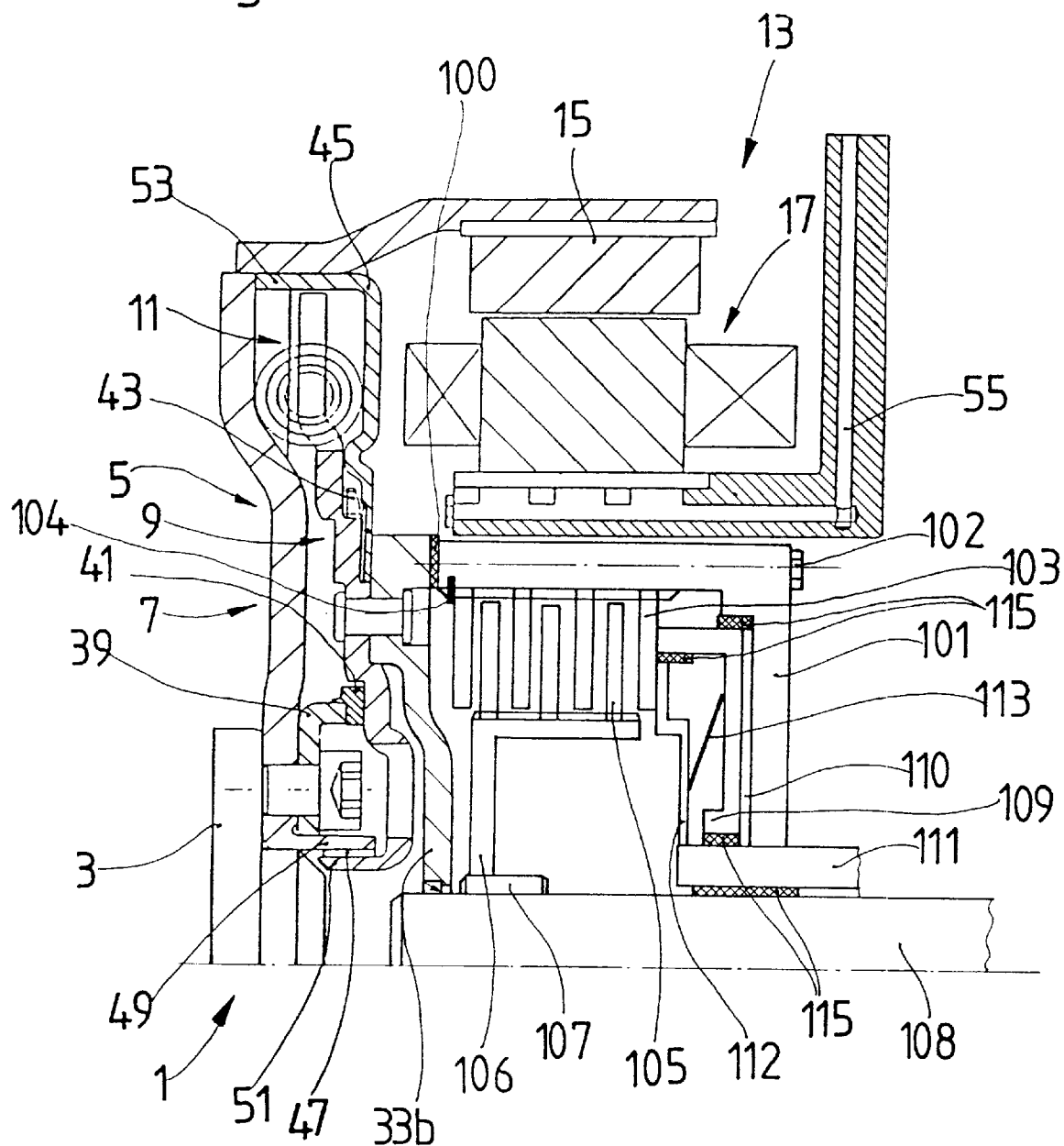

TORQUE TRANSMISSION UNIT

BACKGROUND OF THE INVENTION

1. Field of the Invention

The invention relates to a torque transmission unit having a torsion damping device and a shift clutch arranged between an input shaft and an output shaft and an electric machine with a rotor concentrically arranged relative to a stator, the rotor being effectively connected with the input shaft.

2. Description of the Related Art

A torque transmission unit is disclosed in German references DE 43 23 601 A1 and DE 43 23 602 A1 having an electric machine combined with a torsion damping device and a shift clutch. These references show that one of the shift clutch and the torsion damping device may be arranged within a central construction space delimited by the stator of the electric machine. Torsion damping elements of the torsion damping devices are shown as being integrated into the clutch disk of the shift clutch. While the known means for torsion damping do reduce torsional vibrations, these known means are not sufficient particularly, for example, in luxury vehicles in which special vibration damping is expected and in compact economy vehicles which are designed for a particularly low energy consumption and therefore typically have a more pronounced vibration behavior within the drive train. Although it is possible to employ an electric machine for additional torsion damping, the use of the electric machine for this purpose consumes additional energy.

SUMMARY OF THE INVENTION

The object of the invention is to provide a torque transmission unit for a motor vehicle having good torsion damping characteristics while optimizing the consumption of the electric energy used for torsion damping and simultaneously uses only a small construction space.

The object is achieved by a torque transmission unit according to an embodiment of the present invention having a torsion damping device comprising a primary flywheel mass rotatable relative to a second flywheel mass, the primary mass being effectively connected to an input shaft of the torque transmission unit and the secondary flywheel mass being effectively connected to the output shaft. The torque transmission unit further comprises a shift clutch and an electric motor having a stator and a rotor, wherein the rotor is effectively connected to the input shaft. Furthermore, at least one of the torsion damping device and the shift clutch are arranged within an annular space delimited by the rotor and stator of the electric machine.

The use of the primary and secondary flywheel masses markedly improves torsional vibration damping such that the amount of energy used by the electric machine for torsional vibration damping may be reduced. The mass of known torsion damping devices typically comprise a fluid damping device to damp vibrations at low rotational speeds such as when an internal combustion engine is started or stopped. However, optimum torsional vibration damping may be achieved by an electric machine at these low rotational speeds with comparatively low energy consumption because the torques which occur are comparatively low. Therefore, the use of these fluid damping devices may be eliminated to markedly reduce the outlay in terms of construction for the inventive torsion damping device in the torque transmission unit of the present invention.

Furthermore, the above described embodiment of the present invention beneficially utilizes the axial construction space so that even compact economy vehicles may be equipped with the torque transmission unit according to the present invention.

The internal combustion engines used in economy vehicles with optimized consumption and having a small number of cylinders often suffer from noticeably less than true running properties. A larger flywheel mass may be used to improve the running properties of an internal combustion engine within certain limitations. To utilize this principle, the primary mass of the torsion damping device of the present invention is connected to the rotor of the electric machine which enlarges the primary mass. The rotor of the electric machine thus comprises part of a flywheel mass for the internal combustion engine.

Alternatively, the secondary mass of the torsion damping device may be connected to the rotor of the electric machine. This alternative configuration may be used in torsion damping devices having a design in which a starting aid function is achieved for the internal combustion engine by virtue of the work which is stored in the torsion damping device. The work stored in the torsion damping device may be used to generate a torque which is added to a torque generated by the electric machine during an engine start. Consequently, the electric machine of this configuration may be designed with a lower power than an electric machine which does not use the work stored in the torsion damping device, thereby facilitating small construction space and low energy consumption on using the electric machine.

Model computations have shown that a simple single-disk clutch may present a construction space problem, particularly in high-performance vehicles. It may therefore be expedient to design the shift clutch of the inventive torque transmitting unit as a multiple-disk clutch to optimally utilize the construction space delimited by the rotor and stator of the electric machine.

With a view to a simple torsion damping device which works reliably, the connection of the torsion damping device between the primary mass and the secondary mass may be made by a torque input component and a torque output component with a spring device arranged between the torque input component and the torque output component. The spring device may be used, for example, as a work accumulator for the starting aid function described above.

To produce a compact torque transmission unit, the primary mass may comprise a carrying sleeve on which the secondary mass is rotatably mounted.

The primary and secondary masses may designed as sheet metal parts. Furthermore, the secondary mass may further comprise a guide sleeve rotatably mounted on the carrying sleeve of the primary mass.

For this purpose, the carrying sleeve has a stop for receiving an axial bearing point of the guide sleeve.

To simplify assembly, the guide sleeve may be produced in one integral piece with the rotor.

To simplify the design of the components, particularly with regard to forming work steps of forming sheet metal components, the guide sleeve may comprise a circumferential transmission profile which engages a counterprofile of the torque input component or the torque output component of the torsion damping device. The use of the circumferential transmission profile allows the torque components to be subdivided and also simplifies assembly. Furthermore, the profile connection between the circumferetial transmission profile and the counterprofile of the torque components may be used to achieve radial and axial tolerance compensation within the torsion damping device.

When the rotor of the electric machine is connected as part of the primary mass, the rotor may comprise a split design having multiple rotor segments in which one of the rotor segments is connected to the input shaft and another of the rotor segments is connected to the torsion damping device. This embodiment simplifies the connection of the rotor to the two functional components mentioned, namely the input shaft and torsion damping device.

To utilize the construction space within the stator and rotor of the electric machine in terms of maximum damping work of the torsion damping device, the torsion damping device may comprise a parallel arrangement of a plurality of spring devices. The torque input and torque output parts for each spring are combined to form a structural unit.

In a further embodiment, one of the torque components may comprise a cylindrical basic body having a first receiving portion and a second receiving portion at an axial distance from one another for guiding a first of the plural spring devices and at least a further receiving portion for guiding a second of the plural spring devices.

The basic body may further comprise slotlike cutouts forming a profile into which the further receiving portions engage and are consequently held axially and radially to simplify the assembly of the torque components. As a result of this layered form of construction, assembly of the torsion damping device may be limited to a purely axial assembly direction.

In yet a further embodiment, the shift clutch may comprise a wet-running lamellar clutch. The particular advantage of the wet-running lamellar clutch as a shift clutch is that a comparatively high torque capacity may be obtained in a relatively small construction space.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS ,

In the drawings, wherein like reference characters denote similar elements throughout the several views:

FIG. 1b is a partial longitudinal sectional view of a torque transmission unit according to another embodiment of the present invention similar to FIG. 1a;

DETAILED DESCRIPTION OF THE PRESENTLY PREFERRED EMBODIMENTS

Figure 1A:
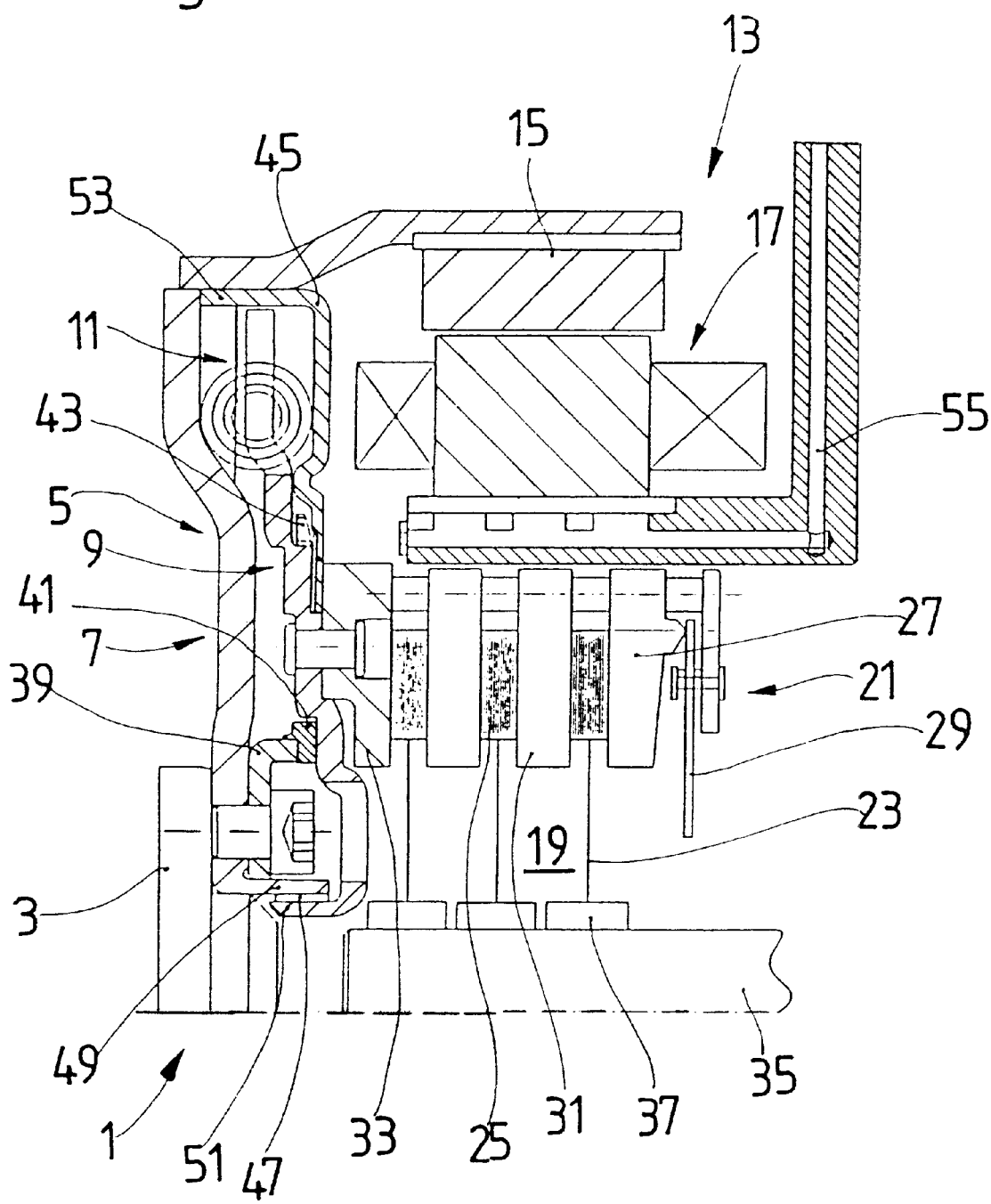
FIG. 1a is a partial longitudinal sectional view of a torque transmission unit according to an embodiment of the present invention having an end torsion damping device and an inner shift clutch.

FIG. 1a shows a torque transmission unit 1 according to an embodiment of the present invention having an input shaft 3 operatively connected to an engine (not illustrated), i.e., an internal combustion engine, in a motor vehicle. A torsion damping device 5 having a primary mass 7 and a secondary mass 9 is connected to the input shaft 3. Circumferentially disposed spring devices 11 are arranged between the primary mass 7 and the secondary mass 9 for bracing the primary mass 7 relative to the secondary mass 9. Accordingly, the primary mass 7 is rotatable relative to the secondary mass 9 against an elastic force of the circumferentially disposed spring devices 11. This design of a torsion damping device is known, for example, from DE 36 30 398 C2 or DE 44 44 196 A1.

The torsion damping device 5 is followed in the axial direction by an electric machine 13, the essential components of which include a rotor 15 and a stator 17 arranged concentrically to one another. The electric machine 13 is illustrated diagrammatically in terms of its most important components in FIG. 1a and may be designed as a synchronous or asynchronous machine. In this exemplary embodiment, the electric machine 13 is designed as an external-rotor motor. The radial inner surface and the axial ends of the rotor 15 and stator 17 define an annular space 19. A shift clutch 21—designed as a multiple-disk clutch in FIG. 1a—is arranged in the annular space 19. In this embodiment, the shift clutch 21 comprises three clutch disks 23, each having a friction surface 25. A pressure plate 27 of the shift clutch 21 in conjunction with a prestressing spring such as, for example, a diaphragm spring 29 tensions the clutch disks 23 against a thrust plate 33. Intermediate plates 31 are arranged between adjacent friction surfaces 25 of the clutch disks 23. The thrust plate 33 is connected, for example, riveted to the secondary mass 9 of the torsion damping device 5.

The clutch disks 23 are connected to an output shaft 35 via hubs 37. This connection is a positive connection in a circumferential direction while allowing movement in the axial direction.

The primary mass 7 of the torsion damping device 5 is positively connected, i.e., screwed, firmly to the input shaft 3. Furthermore, a bearing carrier 39 supporting an axial bearing 41 for the secondary mass 9 is fastened to the input shaft 3. The primary mass 7 further comprises a cover disk 45 connected at a radial outer side of the primary mass 7 and extending radially inward, said primary mass 7 and said cover disk 45 axially enclose said spring devices 11. A compression spring 43 designed as a cup spring braces the cover disk 45 of the primary mass 7 relative to the secondary mass 9, to ensure the proper axial positioning of the primary mass 7 relative to the secondary mass 9.

A radial bearing 47 arranged between continuous edges 49, 51 of the primary mass 7 and the secondary mass 9 radially guides the secondary mass 9 relative to the primary mass 7.

Starting from the input shaft 3, the torque transmission unit 1 comprises two force flux paths. The driving torque of the input shaft 3 is transmitted to the primary mass 7 of the torsion damping device 5. The rotor 15 is connected to the radial outer side of the primary mass 7, i.e., an outer surface 53 of the cover disk 45, and is therefore to be considered to be part of the primary mass 7. Furthermore, the primary mass 7 is considered as the entire component mass arranged in functional terms between the input shaft 3 and the spring device 11. On this force flux path, the electric machine 13 is operated as a generator.

The second force flux path extends from the input shaft 3 to the primary mass 7 and, via the spring device 11, to the secondary mass 9 which transmits the applied torque to the thrust plate 33 and consequently to the shift clutch 21. The secondary mass therefore also comprises the masses of the entire shift clutch 21 which may be opened for an operation of shifting a gear, likewise not illustrated. When the shift clutch 21 is opened, the force flux from the secondary mass 9 to the clutch disks 23 is interrupted.

The electric machine 13 may also be used for an operation to start the engine. During the starting operation, the shift clutch 21 is opened via actuation of the diaphragm spring 29. In FIG. 1 the diaphragm spring 29 is pressed toward the primary mass 7 to open the shift clutch 21. Alternatively, other diaphragm spring configurations may be used in which the shift clutch 21 is opened by a pulling movement on the diaphragm spring 29 away from the primary mass 7.

With the shift clutch 21 open, the driving torque of the stator 17 may be transmitted to the rotor 15 without any influence on the output shaft 35. The rotor 15 drives the primary mass 7 and consequently rotates the input shaft 3.

Heat generated in the stator 17 may be dissipated when the electric machine 13 is in operation by a cooling device 55 connectable to the cooling system of the internal combustion engine.

The torque transmission unit 1 has a highly compact design, this being attributable, in particular, to the arrangement of the shift clutch 21 in the annular space 19.

A torque transmission unit 1' illustrated in FIG. 1b differs from the torque transmission unit 1 illustrated in FIG. 1a only in that the dry multiple-disk clutch 21 has been replaced by a wet-running lamellar clutch 99. The other parts of the torque transmission unit 1' in FIG. 1b are the same as those described above and therefore are referenced using the same reference characters. Accordingly, only the wet-running lamellar clutch 99 will be described with reference to FIG. 1b.

The wet-running lamellar clutch 99 has an outer clutch cage 101 connected via an intermediate sealing disk 100 to a thrust plate 33' by a plurality of fastening elements 102 distributed about a circumference of the outer clutch cage 101. The thrust plate 33' is riveted or otherwise fixedly connected to the secondary mass 9 of the torque transmission unit 1'. Alternatively, the thrust plate 33' may also be connected to the secondary mass 9 via a plug connection.

External lamellae 103 are fixed with respect to rotation and axially displaceable relative to the outer clutch cage 101 via an external toothing. The one of the external lamellae 103 that is adjacent to the torsion damping device 5 is fixed in its axial position toward the thrust plate 33' by an axially acting securing element 104.

For torque transmission through the wet-running lamellar clutch 99, internal lamellae 105 are pressed between the external lamellae 103. The internal lamellae 105 are connected to an inner clutch cage 106 by an internal toothing and are fixed with respect to rotation and axially displaceable. An inside diameter of the inner clutch cage 106 is connected to a clutch hub 107 via a connection that may be a materially integral, positive or nonpositive connection. A meshed engagement via a splined toothing between the clutch hub 107 and the output shaft 108 is provided for torque transmission. The external and internal lamellae 103, 105 are subjected to the required pressure force for a torque transmission by a piston 109. A cylindrical space 110 defined between radially extending portions of the outer clutch cage 101 and the piston 109 is filled with pressurized fluid such as a transmission oil. A rotary leadthrough element 111 mounted opposite the output shaft 108 and sealed off is provided for supplying the fluid to the cylindrical space 110. During actuation, that is to say when the clutch is engaged, the piston 109 is displaced relative to a fixed intermediate plate 112 toward the thrust plate 33' in response to the pressure of fluid in the cylindrical space 110. An interposed cup spring 113 is prestressed as the piston 109 moves toward the thrust plate 33' so that when the fluid drains off from the cylindrical space 110 during a disengagement procedure, the cup spring 113 ensures a return movement of the piston 109 away from the thrust plate 33'. To decrease the thermal load on the wet-running lamellar clutch 99, a directed supply of cooling fluid through the rotary leadthrough 111 may also be provided.

As shown in FIG. 1b, a plurality of seals 115 are used to seal off the various fluid spaces of the wet-running lamellar clutch 99.

Figure 2:
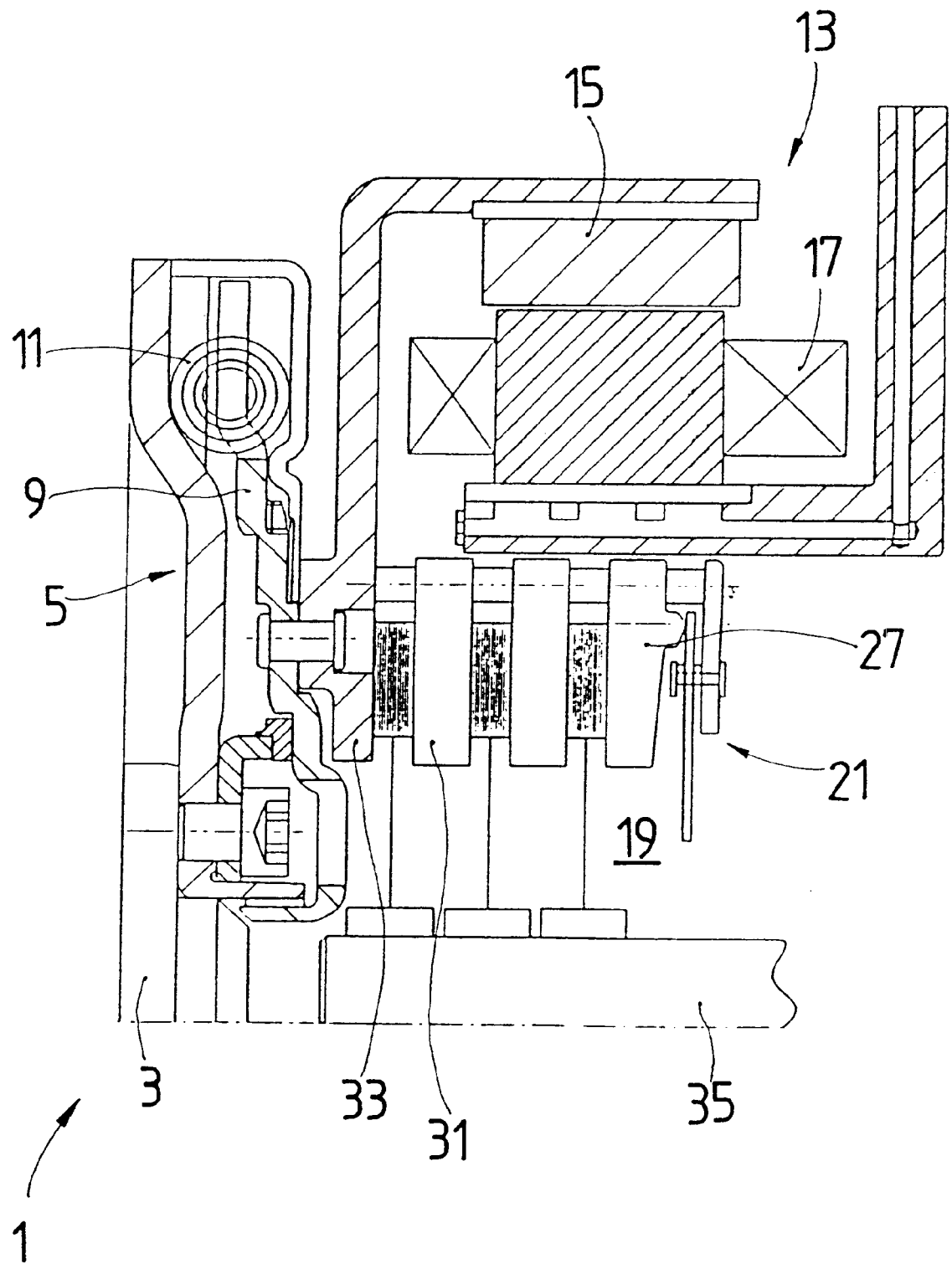
FIG. 2 is a partial longitudinal sectional view of a torque transmission unit according to another embodiment of the present invention similar to FIG. 1.

FIG. 2 shows a modification of the torque transmission unit of FIG. 1a. Elements of the torque transmission unit in FIG. 2 which correspond to those described above are indicated by the same reference member with a suffix "a". Only the differences from the embodiment of FIG. 1a are discussed. The major difference from the design according to FIG. 1a is that the rotor 15a is connected to the secondary mass 9a of the torsion damping device 5a. Starting from the input shaft 3a, the force flux to the shift clutch 21a runs in the same way as in FIG. 1a. However, the spring device 11 of the torsion damping device 5a is arranged in the force flux path from the input shaft 3a to the rotor 15a. Accordingly, the rotor 15a is consequently no longer to be considered as part of the primary mass 7a. Instead, the rotor 15a is part of the secondary mass 9a in this embodiment. Even though the rotor 15a is not directly connected to the input shaft 3a in the embodiment, the rotor 15a is effectively connected to the input shaft 3a via the force flux path through the torsion damping device 5a. Accordingly, the term "effectively connected" as used in the specification and claims comprises a direct connection and a connection via a force flux path.

The configuration of the torque transmission unit 1a in FIG. 2 allows a special method to be used for starting an internal combustion engine connected to the input shaft 3a using an electric machine 13a connected to the secondary mass 9a of the torsion damping device 5a, the special method reducing the size of the electric motor required to start the internal combustion engine thereby conserving both installation space and energy. For performing this special starting procedure, the shift clutch 21a is opened so that the rotor 15a is separated from the output shaft 35a. In a first step of the special method, the secondary mass 9a is rotated counter to the predetermined running direction of the internal combustion engine while the input shaft 3a and the primary mass 7a connected thereto are held by the holding moment of the stationary internal combustion engine. The movement of the secondary mass 9a relative to the primary mass 7a prestresses the spring device 11a. The holding moment of the internal combustion engine results from the compression to be expended in the internal combustion engine. The secondary mass 9a is subsequently allowed to run back in the direction of rotation of the internal combustion engine under the urgency of the prestressed spring device 11a. The mass inertia of the secondary mass 9a and rotor 15a and the thrust plate 33a, the intermediate plates 31, and pressure plate 27 of the shift clutch 21, takes effect at the same time. During the rotational movement of the secondary mass 9a a driving torque is superposed on the mass inertia by the electric machine 13a which functions as a motor during the starting operation. Utilizing this flywheel moment in addition to the drive torque of the electric machine 13a allows the electric machine to have smaller dimensions than would be necessary m purely computational terms if the electric machine alone were required for the starting operation. The starting operation typically requires higher power than the operation of electric secondary assemblies, such as lighting devices, radios, etc., which are fed by the electric machine 13. Since the starting operation requires the highest power, the power required for starting the engine dictates the size of electric machine to be installed. Accordingly, a torque transmission device configured for using the above-described special starting procedure allows a smaller electric machine to be installed.

It may also be noted that the rear side of the rotor 15a may be designed as a thrust plate 33a, thus resulting in a further benefit in terms of space. The embodiment of FIG. 2 may also use a wet-running lamellar clutch as shown in FIG. 1b.

Figure 3:
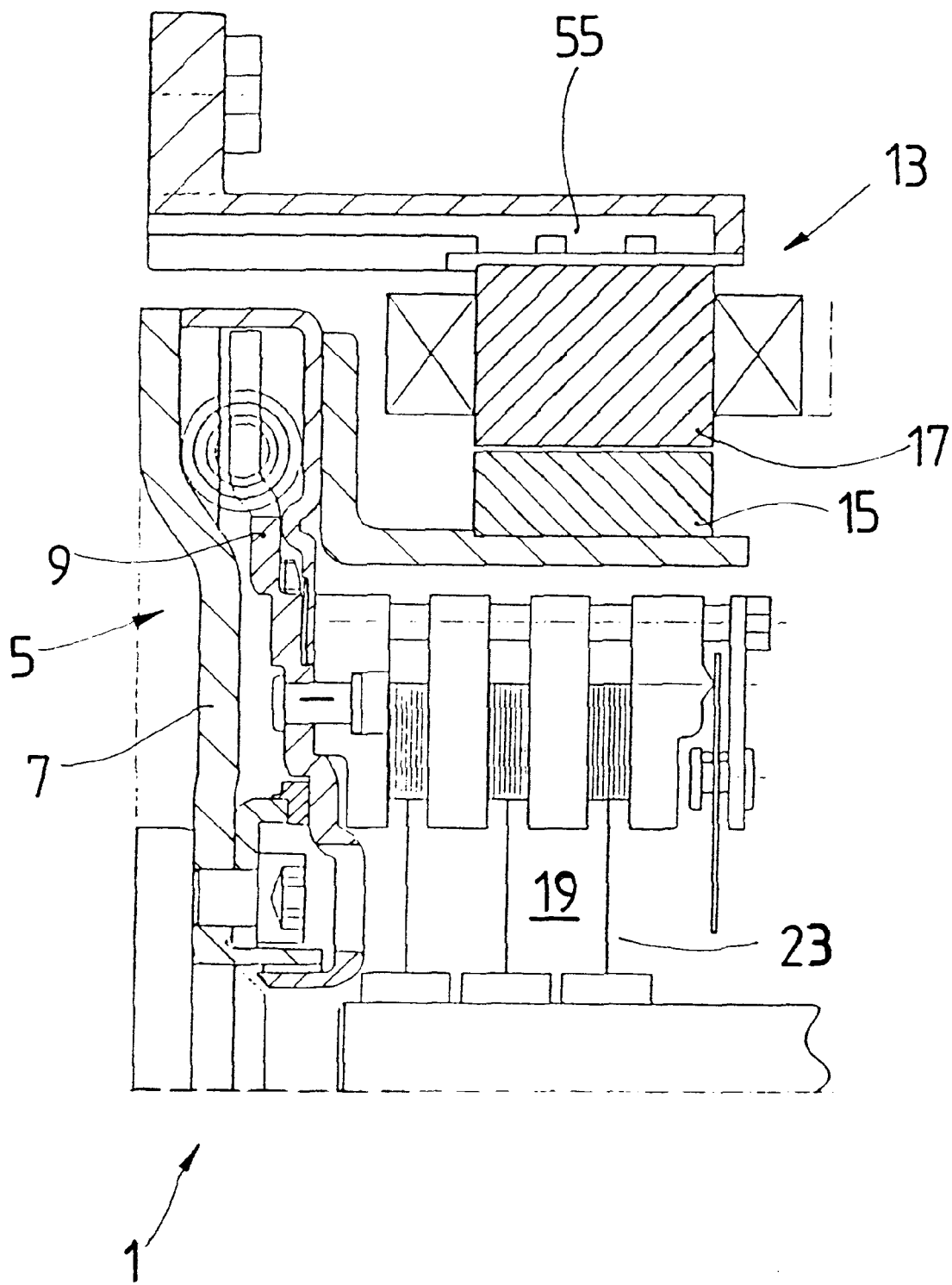
FIG. 3 is a partial longitudinal sectional view of a torque transmission unit according to another embodiment of the present invention similar to FIG. 1a but having an internal rotor.
Figure 4:
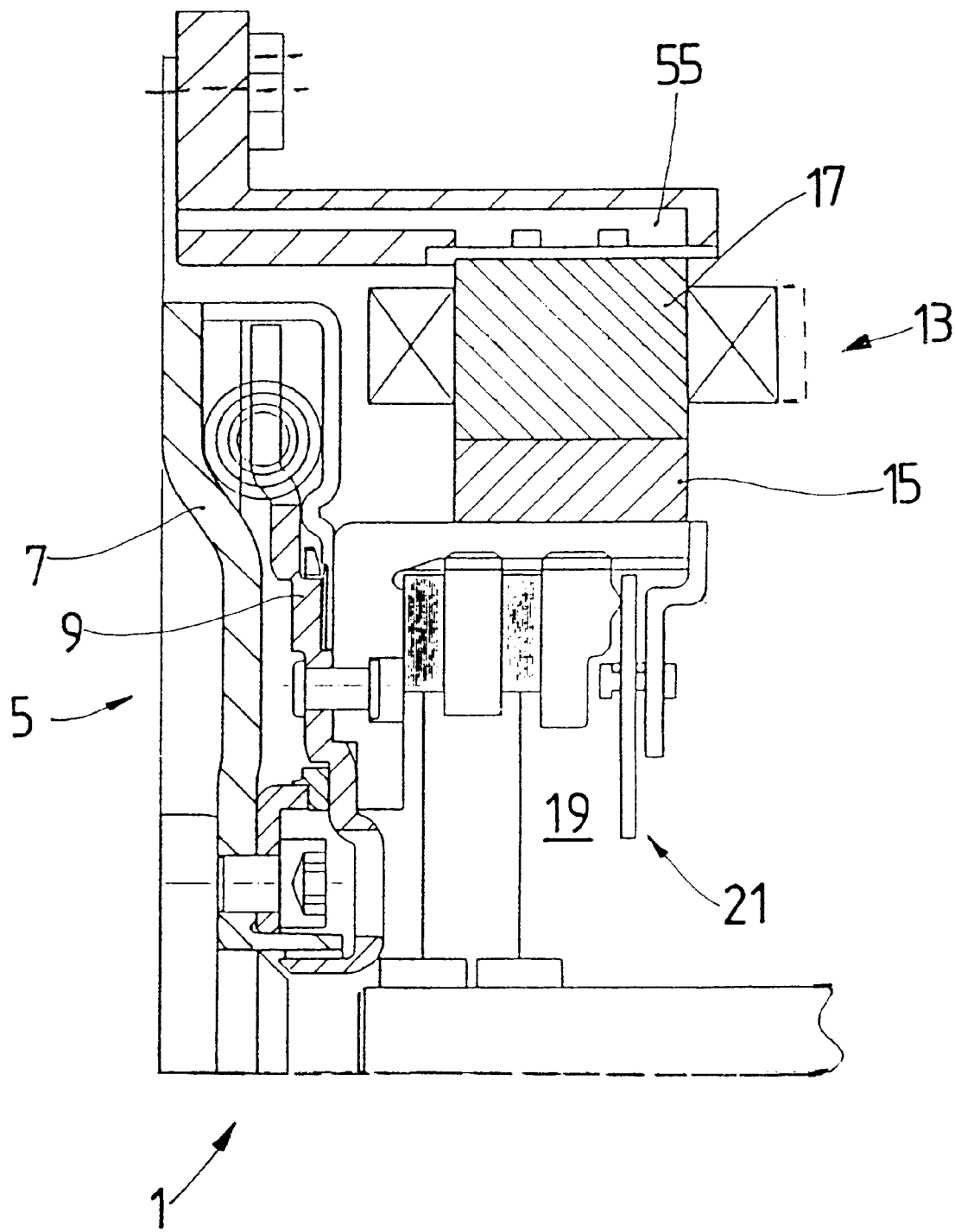
FIG. 4 is a partial longitudinal sectional view of a torque transmission unit according to another embodiment of the present invention similar to FIG. 3.

FIGS. 3 and 4 correspond to the embodiments shown in FIGS. 1 and 2 and illustrate that the electric machine 13, 13a may also be designed as an internal-rotor motor. Furthermore, the number of clutch disks 23, 23a is determined as a function of the driving torque of the combustion engine and the available annular space 19, 19a. That is, any number of clutch disks may be used dependent on the requirement of the particular application in which it is used.

Figure 5:
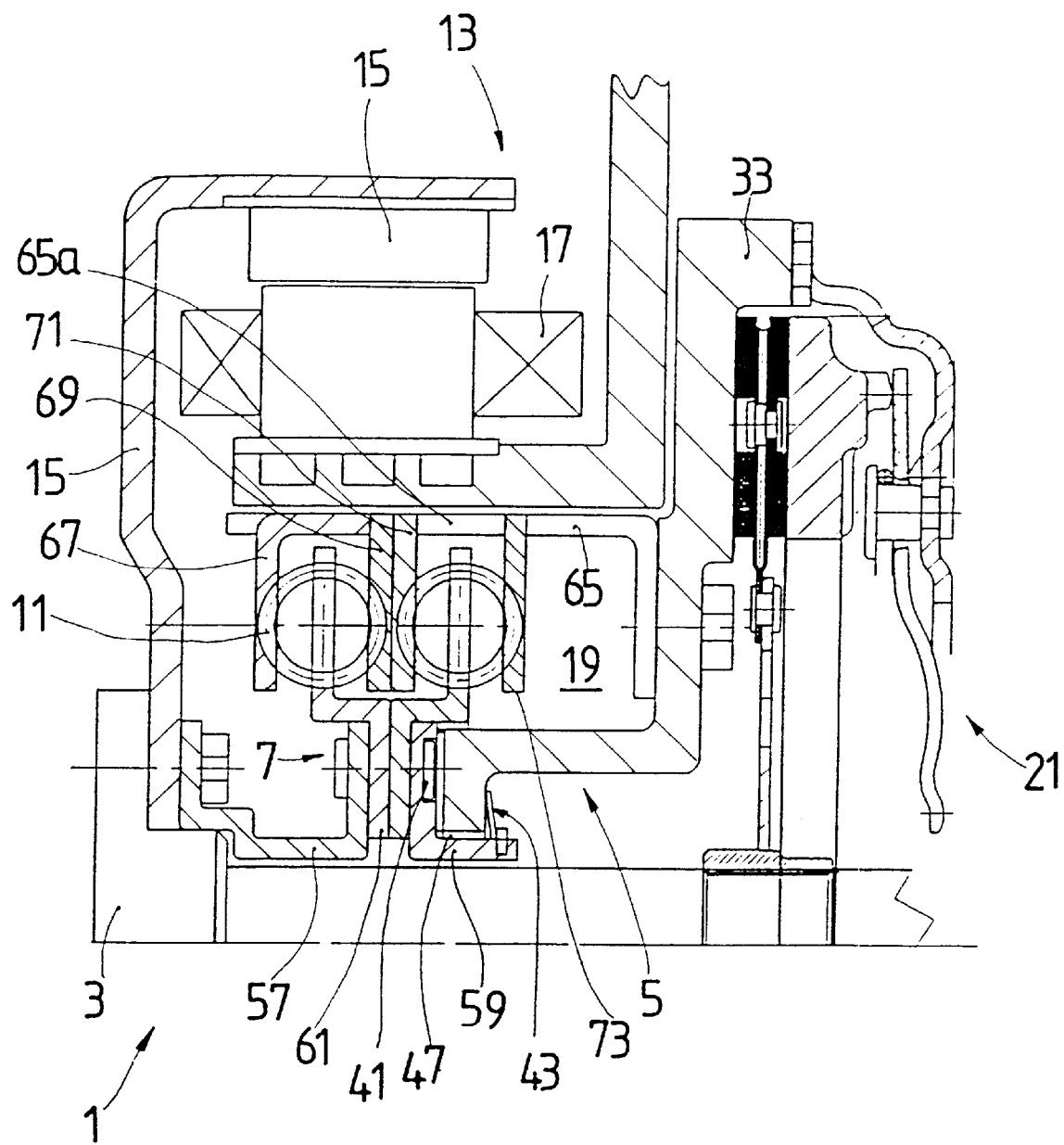
FIG. 5 is a partial longitudinal sectional view of a torque transmission unit according to an embodiment of the present invention having an end-face clutch.

FIG. 5 shows a further embodiment of a torque transmission unit 1b. Elements of the torque transmission unit in FIG. 5 which correspond to those described above are indicated by the same reference number with a suffix "b". Only the differences from the embodiments described above are discussed. The shift clutch 21b of the torque transmission unit 1b is arranged on an end face of the electric machine 13b and the torsion damping device 5b is arranged in the annular space 19b within the stator 17b of the electric machine 13b. The rotor 15b is connected to the input shaft 3a of the torque transmission unit 1b and consequently to the primary mass 5b. The primary mass 5b also comprises two angle rings 57b, 59b and two carrier rings 61b, 63b having a stepped profile. The spring device 11b has two parallel spring devices respectively arranged in cutouts of the carrier rings 61b, 63b. The angle rings 57b, 59b and the carrier rings 61b, 63b are considered as torque input components in the torsion damping device 5b and will therefore collectively be referred to as torque input components 57b, 59b, 61b, and 63b. A torque output component of the torsion damping device 5b comprises a cylindrical basic body 65b having receiving portions 67b, 69b, 71b and 73b with apertures for guiding the two parallel spring devices 11b. The basic body 65b has slotlike cutouts 65b for the axially and radially guiding the insertion of the receiving portions 67b, 69b and 71b in the basic body 65b. The torque output component, i.e., basic body 65b, is connected to the thrust plate 33b of the shift clutch 21b. The basic body 65b is movable in a circumferential direction relative to the torque input components 57b, 59b, 61b, and 63b against a force of the spring devices 11b and consequently achieves vibration damping.

The rotor 15b is effectively connected to the input shaft 3b via a direct connection using, for example, a screw or other threaded connection and is therefore mounted in a clearly defined manner. The primary mass 7b, the angle rings 57b, 59b and the carrier rings 61b, 63b are likewise directly connected to the input shaft 3b. The entire secondary mass 9b, including the thrust plate 33b is rotatably supported on the primary mass 7b via bearings 41b, 47b on the angle ring 59b. The compression spring 43b braces the secondary mass 9b relative to the primary mass 7b.

Figure 6:
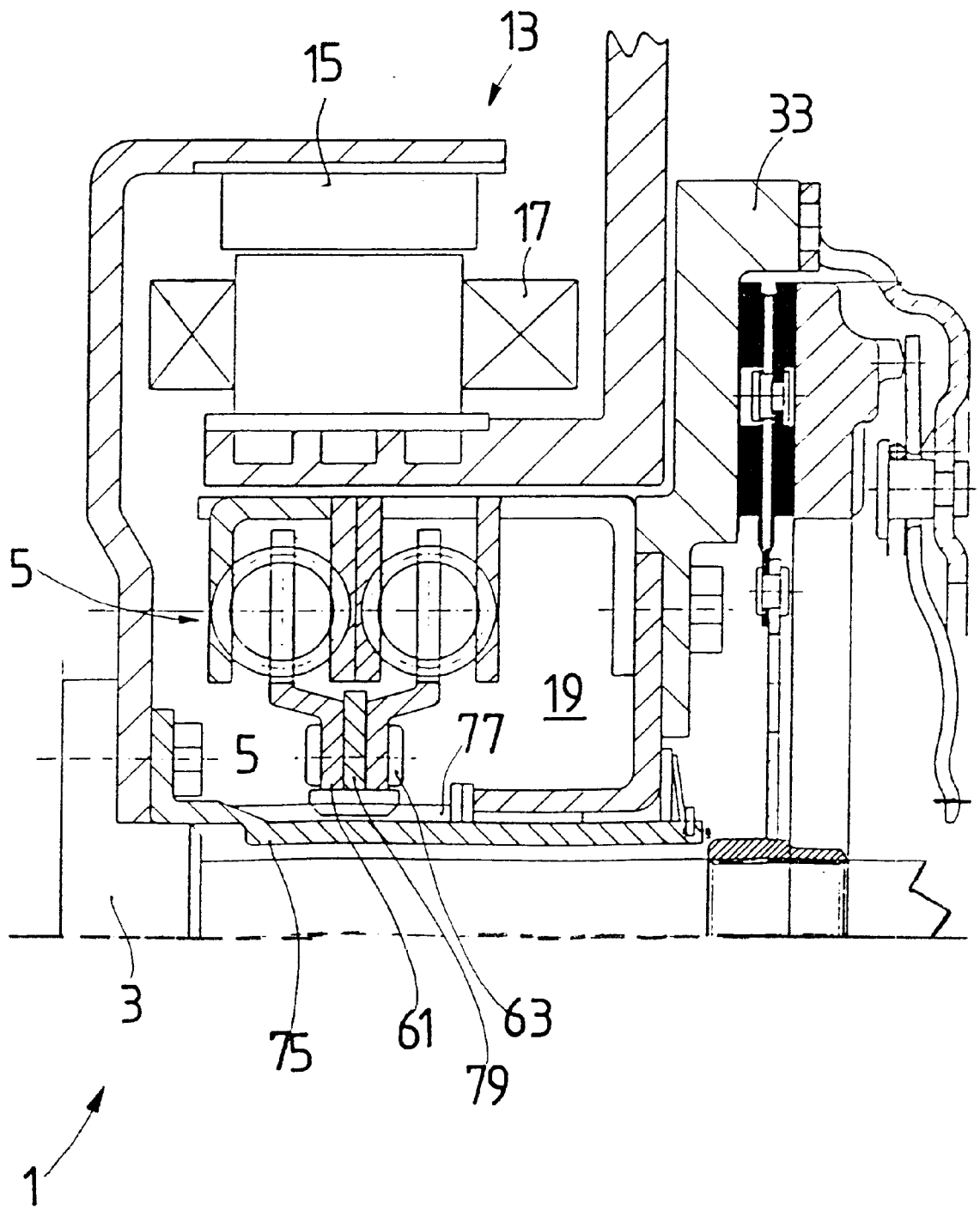
FIG. 6 is a partial longitudinal sectional view of a torque transmission unit according to another embodiment of the present invention similar to FIG. 5.

FIG. 6 shows a design modification to the torque transmission unit 1b of FIG. 5. Only the differences from the embodiment of FIG. 5 are discussed. A carrying sleeve 75b is added to the primary mass 7b in FIG. 6. The carrying sleeve 75b has a circumferential transmission profile 77b on its outside diameter. Furthermore, a ring wheel 79 is arranged between carrier rings 61b, 63b. A radially inner diameter of the ring wheel 79b has a profile for forming a torque input component which is axially movably mounted on the carrying sleeve 75b. The torque output component, i.e., basic body 65b, corresponds to the design according to FIG. 5. The advantage of this design is that simple sheet metal parts are used for the primary mass 7b and axial tolerance compensation between the thrust plate 33b and the torsion damping device 5b may be achieved.

Figure 7:
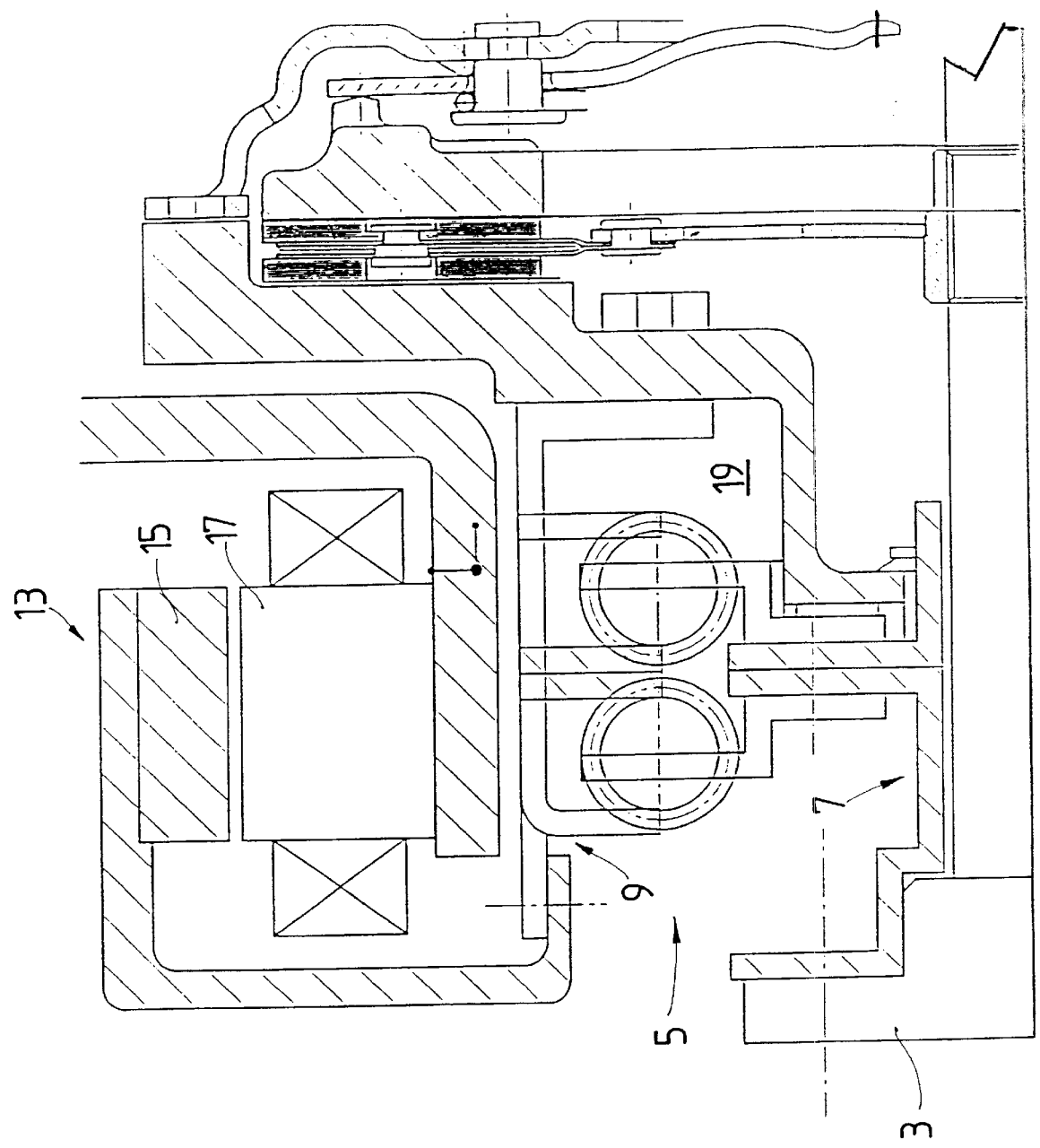
FIG. 7 is a partial longitudinal sectional view of a torque transmission unit according to another embodiment of the present invention similar to FIG. 5.

The embodiment of FIG. 5 and modification of that embodiment as shown in FIG. 6 show a rotor 15b connected directly to the input shaft 3b. FIG. 7 illustrates that the design principle of FIG. 5 may be maintained even when the rotor 15b is connected to the secondary mass 9b.

Figure 8:
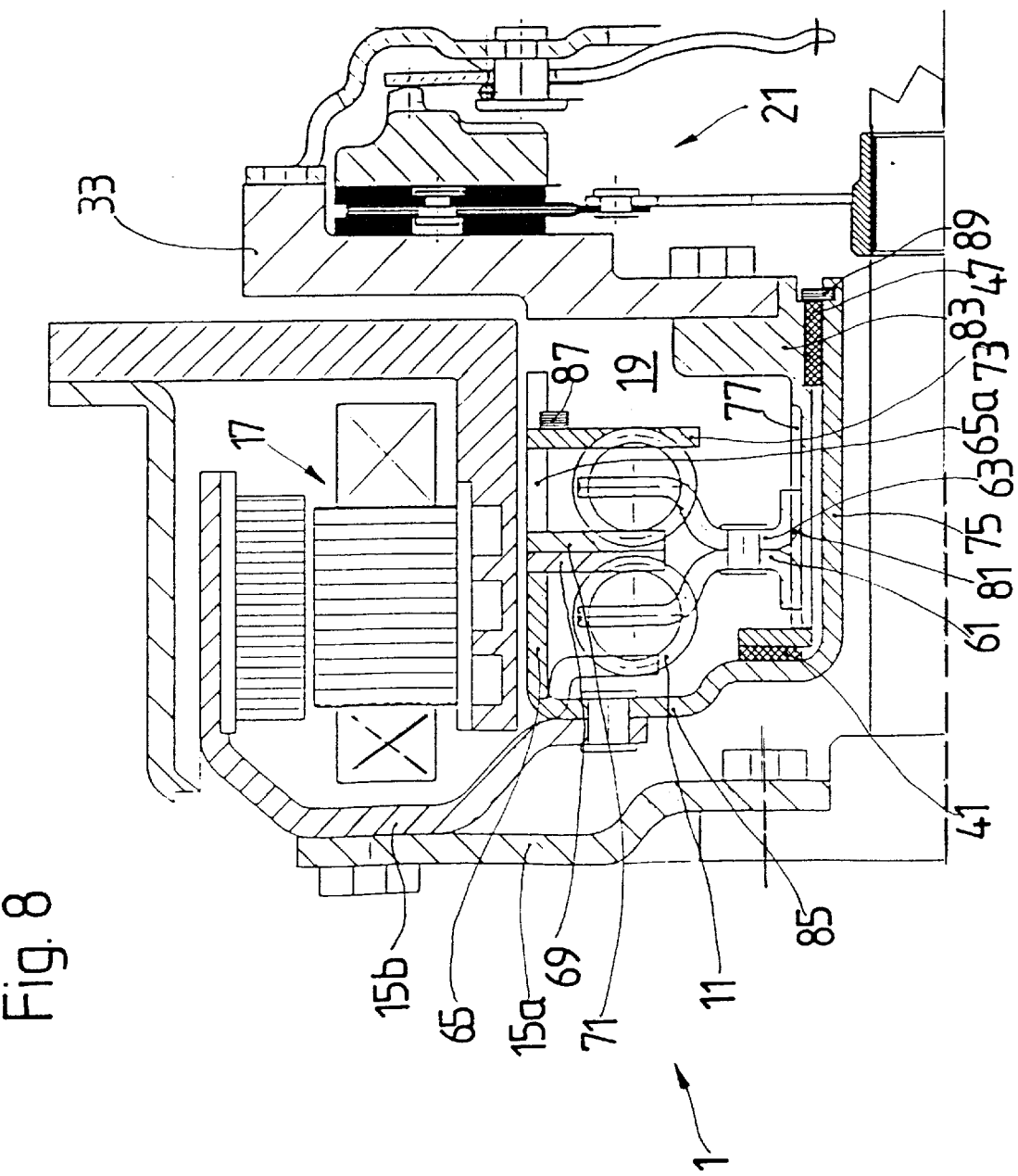
FIG. 8 is a partial longitudinal sectional view of a torque transmission unit according to another embodiment of the present invention similar to FIG. 5.

FIG. 8 shows a further embodiment of the torque transmission device 1c according to the present invention. Elements of the torque transmission unit in FIG. 8 which correspond to those described above are indicated by the same reference number with a suffix "c". Only the differences from the embodiments described above are discussed. The torque transmission device Ic comprises a rotor 15c having a plurality of rotor segments 15c', 15c" which allows the assembly sequence of the torque transmission unit 1c to be varied. For example, in the embodiment of FIG. 6, assembly of the torque transmission device 1b is always carried out to the left, i.e., toward the input shaft 3b. In that embodiment, the rotor 15b and the stator 17b together comprise a structural unit to be assembled jointly. Accordingly, a long screwing tool must be introduced into the annular space 19b to reach the fastening screws on the input shaft 3b. In contrast, the embodiment of FIG. 8 allows more flexible assembly. In a first assembly step, the carrier ring 61c is connected to carrier ring 63c. The carrier rings 61c, 63c have a counterprofile 81c for meshed engagement with a circumferential transmission profile 77c of a guide sleeve 83c described below. The carrying sleeve 75c is connected to the rotor segment 15c" as a separate work step. In this design, the carrying sleeve 75c may be produced in one piece with the basic body 65c with a radially extending stop 85c connected between the camping sleeve 75c and the basic body 65c. The axial bearing 41c for the secondary mass 9 is subsequently arranged against the stop 85c of the carrying sleeve 75c. The receiving portions 69c, 71c, 73c are then introduced with the spring devices 11c into the basic body 65c. A securing ring 87c holds the receiving portions 69c, 71c, 73c together in the basic body 65c. The guide sleeve 83c is subsequently introduced into the bowl-shaped structural unit composed of the carrying sleeve 75c and the basic body 65c such that the circumferential transmission profile 77c and the counterprofile 81c engage one into the other. The radial bearing 47c is arranged on the carrying sleeve 75c for centering the guide sleeve 83c relative to the carrying sleeve 75c. A further securing ring 89c is arranged on the carrying sleeve 75c to prevent the guide sleeve 83c from drifting axially on the carrying sleeve 75c. The torsion damping device 5c is thus assembled completely and may be introduced into the stator 17c. The stator 17c is fastened to a housing not illustrated of the internal combustion engine.

The rotor segment 15c' is already fastened to the input shaft 3c. Fastening means 91 between the rotor segments 15c' and 15c" are accessible radially from outside via corresponding cutouts provided in the housing of the torque transmission unit 1c. Finally, the thrust plate 33c of the shift clutch 21c is connected to the guide sleeve 83c via, for example, a screw or other threaded connector.

In this embodiment, the rotor 15c, the rotor segments 15c', 15c", the carrying sleeve 75c and the basic body 65c are considered part of the primary mass 7c. The carrier rings 61c, 63c, the guide sleeve 83c, and the thrust plate 33c are considered part of the secondary mass 9c.

Figure 9:
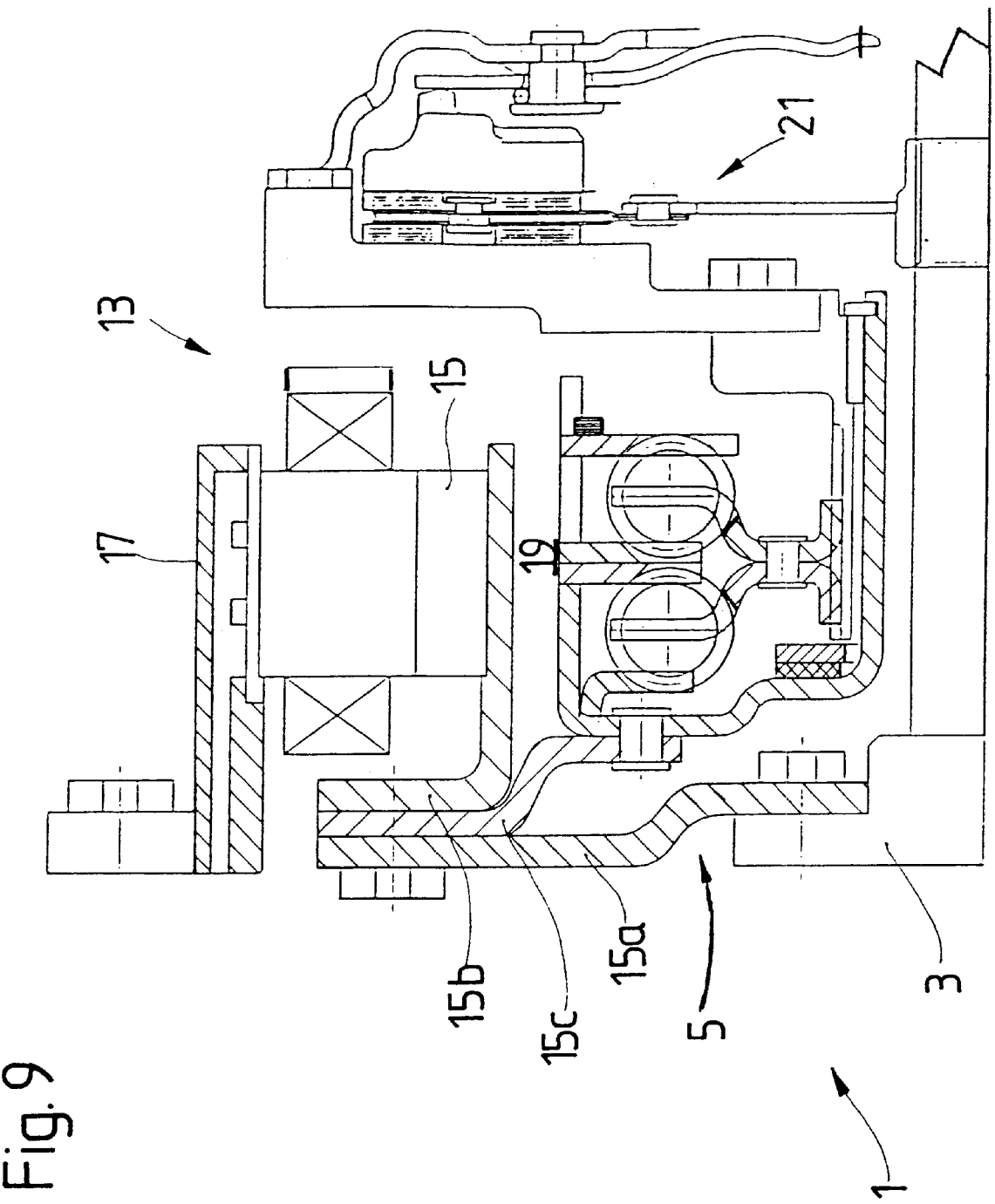
FIG. 9 is a partial longitudinal sectional view of a torque transmission unit according to another embodiment of the present invention similar to FIG. 5.

FIG. 9 shows a design of the torsion damping device 5c similar to that of FIG. 8. In contrast, the electric machine 13c has an internal rotor 15c comprising three rotor segments 15c', 15c", 15c'''. A comparison of FIGS. 8 and 9 reveals that the reason for splitting the rotor 15c into sections is to obtain rotor segments 15c', 15c", 15c''' which are shaped as simply as possible and that may be produced from a sheet metal blank with little outlay in terms of forming work. The intention is, furthermore, to illustrate that the design of the rotor 15, 15a, 15b, 15c and of the torsion damping device 5, 5a, 5b, 5c is not tied to a specific principle of construction of the electric machine.

Figure 10:
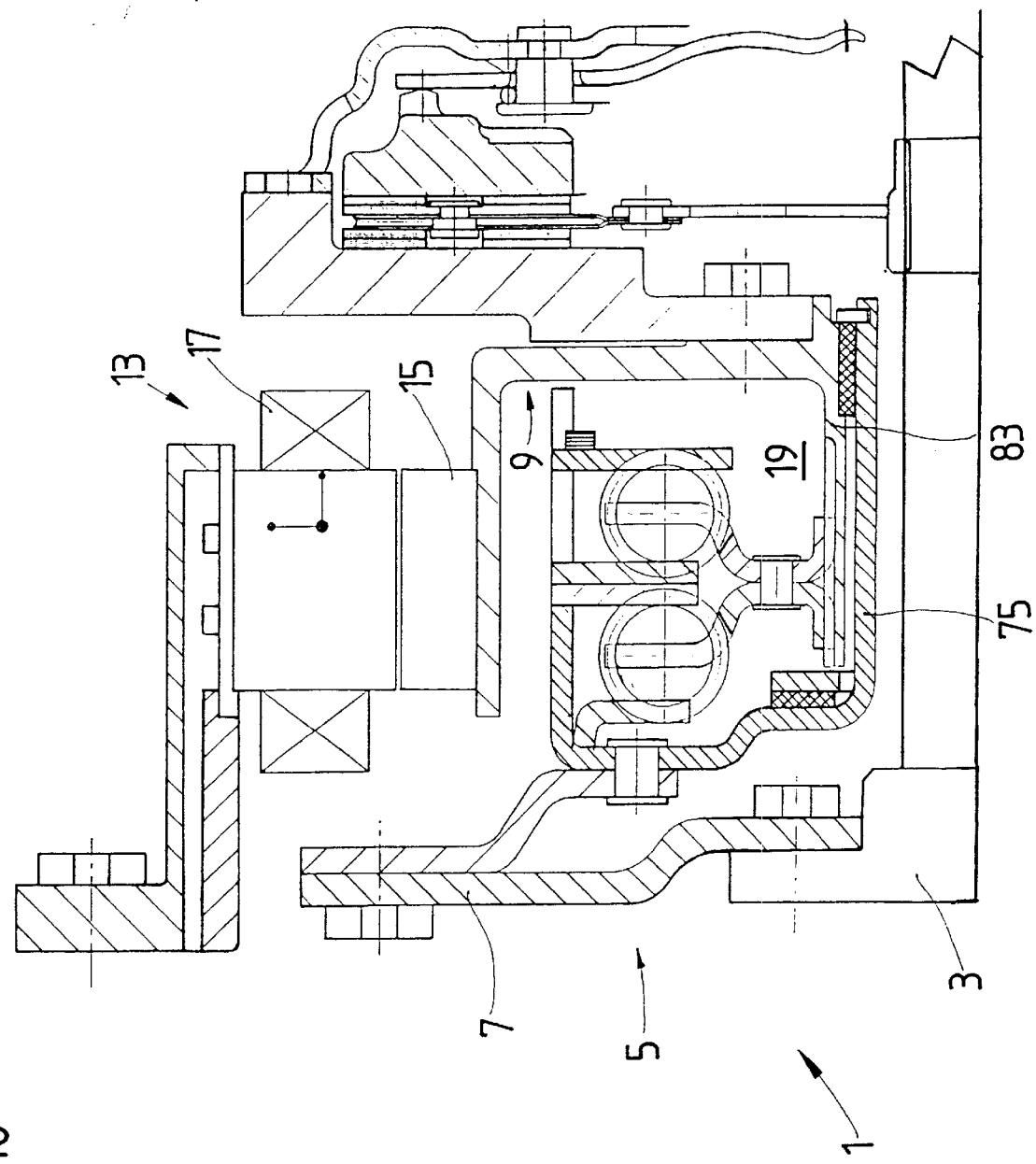
FIG. 10 is a partial longitudinal sectional view of a torque transmission unit according to another embodiment of the present invention similar to FIG. 5.

FIG. 10 illustrates another embodiment of the torque transmission device according to the present invention. Elements of the torque transmission unit in FIG. 10 which correspond to those described above are indicated by the same reference number with a suffix "d". Only the differences from the embodiments described above are discussed. The rotor 15d in FIG. 10 is not a split rotor. Instead, the rotor 15d is produced in one integral piece with the guide sleeve 83d. In this embodiment, the rotor 15d is an integral part of the secondary mass 9d. The purpose of this arrangement is to achieve as large a primary mass 7d as possible.

Figure 11:
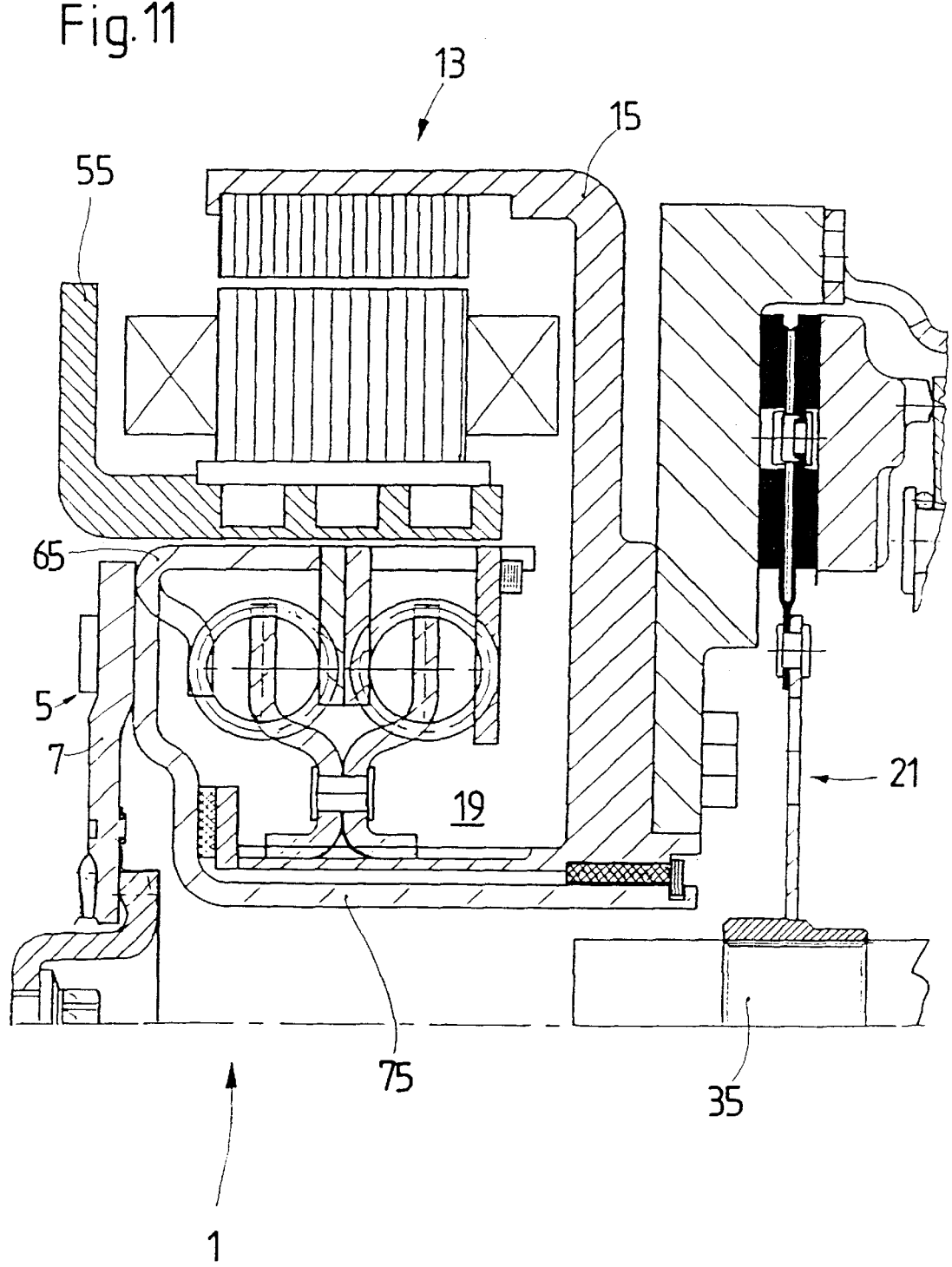
FIG. 11 is a partial longitudinal sectional view of a torque transmission unit according to another embodiment of the present invention similar to FIG. 5.

FIG. 11 shows an embodiment of the torque transmission device 1e according to the present invention. Elements of the torque transmission unit in FIG. 11 which correspond to those described above are indicated by the same reference number with a suffix "e". Only the differences from the embodiments described above are discussed. In the embodiment according to FIG. 11, the electric machine 13e is an external rotor machine with the rotor 15e integrally connected with the guide sleeve 83e as in FIG. 10. Although the basic body 65e and the carrying sleeve 75e of the primary mass 7e of FIG. 11 are integrally connected as in FIG. 10, the primary mass 7e of FIG. 11 is, in principle, smaller so that it may be arranged completely within the annular space 19e of the electric machine 13e. If the rotor 15 is then arranged on the end face toward the output shaft 35d, i.e., toward the shift clutch 21, this configuration allows the cooling device 55e to be oriented on a side of the electric motor 13d facing the internal combustion engine. Accordingly, a particularly simple connection from the cooling device 55e to the cooling circuit of the internal combustion engine may be made.

Figure 12:
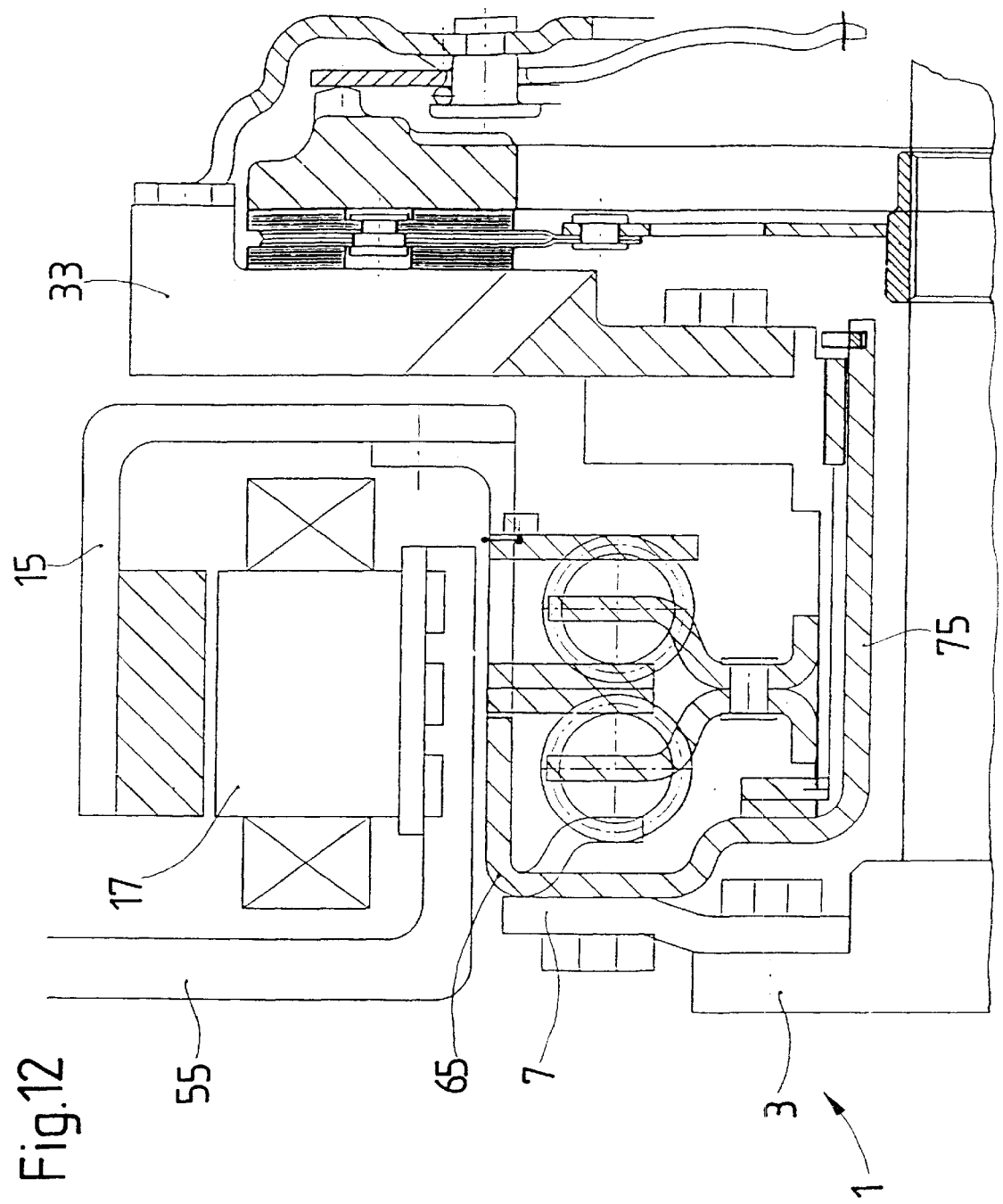
FIG. 12 is a partial longitudinal sectional view of a torque transmission unit according to yet another embodiment of the present invention similar to FIG. 5.

In FIG. 12, contrary to FIG. 11, the rotor 15e is connected to the basic body 65e which, in turn, is connected to the input shaft 3e, so that the rotor 15e forms part of the primary mass 7e. As a result, the primary mass 7e can be increased markedly in size and, nevertheless, the possibility of connecting the cooling device 55e to the cooling circuit of the internal combustion engine in the simple arrangement of FIG. 11 may still be utilized.

Figure 13:
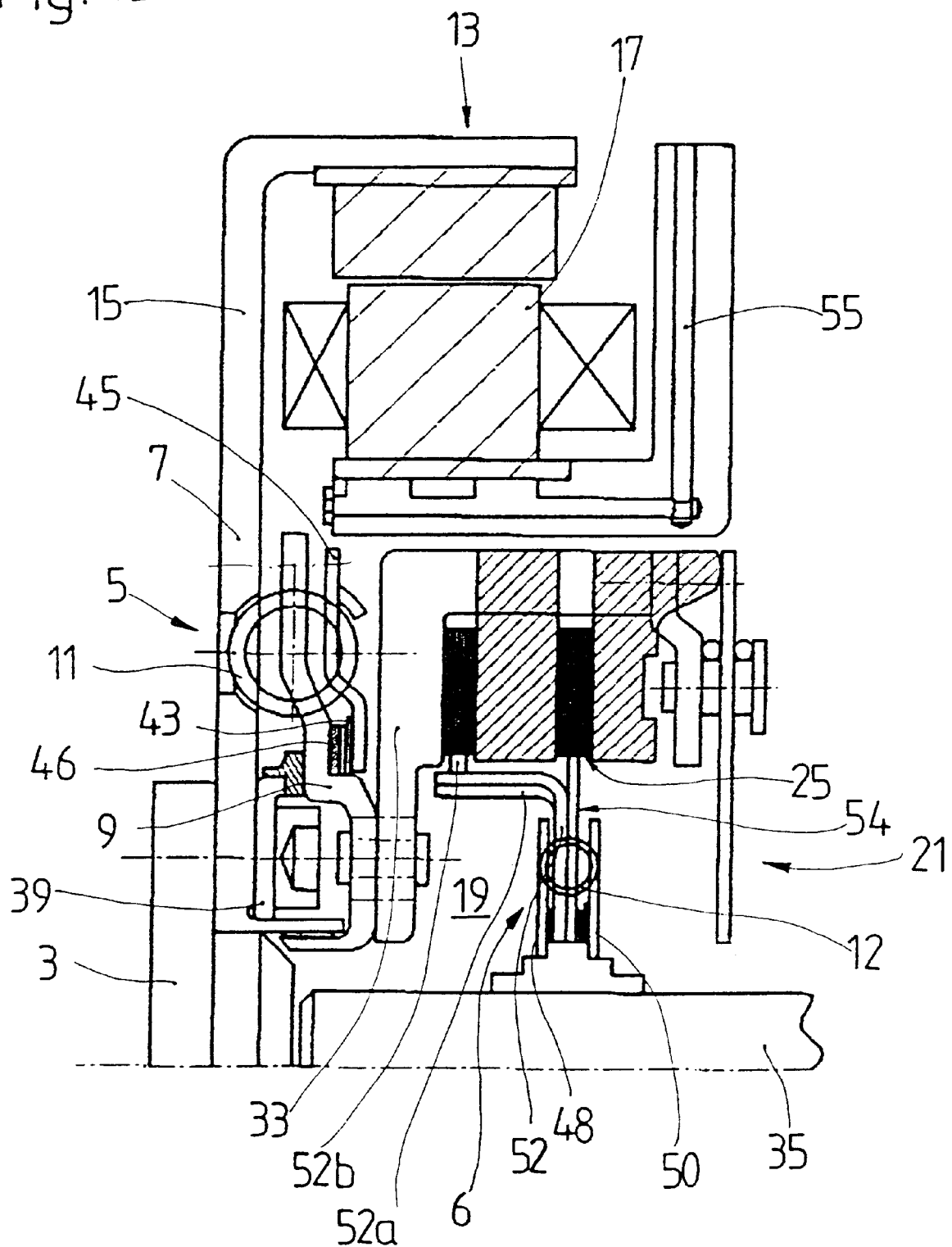
FIG. 13 is a partial longitudinal sectional view of a torque transmission unit according to an embodiment of the present invention having a shift clutch and torsion damping device in an annular space surrounded by a rotor and stator.

FIG. 13 shows a further embodiment of a torque transmission unit If according to the present invention. Elements of the torque transmission unit in FIG. 13 which correspond to those described above are indicated by the same reference number with a suffix "f". Only the differences from the embodiments described above are discussed. The torque transmission unit If comprises a torsion damping device 5f and a shift clutch 21f that are both arranged within the annular space 19f of the torque transmission unit If defined by the rotor 15f and the stator 17f of the electric machine 13f. The primary mass 7f corresponds, in principle, to the embodiment of FIG. 1. In addition, the rotor 15f of the electric machine 13f assumes the function of a cover plate for the spring device 11f of the torsion damping device 5f. The rotor 15f is connected to the cover disk 45f via connecting elements such as, for example, flat rivets illustrated by dashes and dots at the radial outer area of the cover disk 45f. A compression spring 43f is used with a friction disk 46 to forms a friction device which counteracts the oscillating movement between the primary mass 7f and the secondary mass 9f. A bearing carrier 39f may also be adopted from the embodiment of FIG. 1. The connection between the secondary mass 9f and the thrust plate 33f has been shifted radially inward relative to the prior embodiments, out of the radial region of the friction surfaces 25f of the shift clutch 21f.

The shift clutch 21f is designed as a two-disk clutch. However, it should be noted that this exemplary illustration of the shift clutch 21f is not intended to suggest that, in principle, a multiple-disk clutch is necessary. The decision as to the number of clutch disks to be used is dependent on the existing annular space 19f and the shift clutch torque to be 15 transmitted. Accordingly, a single-disk clutch may also be used.

The shift clutch 21f has its own torsion damping device 6f designed as a socalled predamping device. The torsion damping device 6f allows a relatively large angle of rotation with low torque between two cover plates 48f, 50f and two driving disks 52f, 54f. The two cover plates 48f, 50f are connected via a torsion-resistant connection to a hub 37f and the two driving disks 52f, 54f are rotatable in the circumferential direction relative to the hub 37f. The two driving disks 52f, 54f are braced relative to one another via a circumferentially acting spring device 12f. Both the driving disks 52f, 54f and the cover plates 48f, 50f have apertures in which the spring device 12 may be arranged in a prestressed state. Furthermore, the torsion damping device 6f may also contain a friction device similar to that of the torsion damping device 5f. The torsion damping device 6f is optionally used for minimizing gear idling noises from a mechanical shift gear following the torque transmission unit 1f.

The two driving disks 52f, 54f are arranged so that they axially abut each other in the radial regions of the spring device 12f and the hub 37f. Accordingly, only a single hub 37f having a small axial length is required for the torsion damping device 6f. The driving disk 52f is of split design to allow lifting of the left friction surface 25f off of the intermediate disk 31f. An inner component of the driving disk 52f is of bowl-shaped design and has a profiled outer surface 52f' on which a planar driving disk component 52f" is arranged so as to be axially moveable and fixed with respect to cirumferential movement. The left friction surface 25f is arranged on the planar driving disk component 52f".

The two force flux paths described with reference to FIG. 1 are implemented identically in FIG. 13 with the exception of the torsion damping device 6f is interposed between the shaft clutch 21f and the output shaft 35f.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torque transmission unit for a motor vehicle, comprising:

an input shaft and an output shaft, each being independently rotatable about an axis of rotation;

a torsion damping device effectively connected between said input shaft and said output shaft comprising a primary mass and a secondary mass, said primary mass being connected to said input shaft and rotatable relative to said secondary mass about said axis of rotation; and a shift clutch also effectively connected between said input shaft and said output shaft, said shift clutch operatively arranged for selectively varying torque transmission between said input shaft and said output shaft; and an electric motor comprising a stator and a rotor concentrically arranged relative to said stator, wherein said rotor is effectively connected with said input shaft, and wherein at least one of said torsion damping device and said shift clutch is arranged within an annular space delimited by said stator and said rotor of said electric machine, wherein one of said primary mass and said secondary mass of said torsion damping device is fixedly connected to said rotor of said electric machine and wherein said torsion damping device further comprises a torque input component connected for rotation with said primary mass, a torque output component connected with said secondary mass, and a spring device arranged between at least a portion of said torque input component and at least a portion of said torque output component in the circumferential direction such that said torque input component is rotatable relative to said torque output component against an urgency of said spring device.

2. The torque transmission unit of claim 1, wherein said shift clutch comprises a multiple-disk clutch.

3. A The torque transmission unit of claim 1, wherein said torsion damping device comprises a carrying sleeve connected for rotation with said primary mass and wherein said secondary mass is mounted on said carrying sleeve and rotatable relative to said carrying sleeve.

4. The torque transmission unit of claim 3, wherein said secondary mass comprises a guide sleeve rotatably mounted on said carrying sleeve of said primary mass.

5. The torque transmission unit of claim 4, wherein said carrying sleeve comprises a stop and said torque transmission unit further comprises an axial bearing arranged between said stop and said guide sleeve.

6. The torque transmission unit of claim 4, wherein said guide sleeve is integrally arranged as one piece with said rotor.

7. The torque transmission unit of claim 1, wherein said torsion damping device comprises a carrying sleeve connected for rotation with said primary mass and wherein said secondary mass is mounted on said carrying sleeve and rotatable relative to said carrying sleeve, and wherein said secondary mass comprises a guide sleeve rotatably mounted on said carrying sleeve of said primary mass, said guide sleeve having a circumferential transmission profile in meshed engagement with a counterprofile arranged on one of said torque input component and said torque output component.

8. The torque transmission unit of claim 1, wherein said rotor comprises a first rotor segment connected to said input shaft and a second rotor segment connected to said first rotor segment and said torsion damping device.

9. The torque transmission unit of claim 1, wherein said spring device comprises first and second spring devices arranged in a parallel arrangement between said torque input component and said torque output component.

10. The torque transmission unit of claim 9, wherein one of said input torque component and said output torque component comprises a cylindrical basic body having a first receiving portion and a second receiving portion arranged at an axial distance from said first receiving portion for guiding said first spring device and at least one further receiving portion for guiding said second spring device.

11. The torque transmission unit of claim 10, wherein said basic body comprises slotlike cutouts forming a profile into which said first, second and at least one further receiving portions engage and are axially and radially held.

12. The torque transmission unit of claim 1, wherein said shift clutch comprises a wet-running lamellar clutch.

* * * * *